No. 839,090. PATENTED DEC. 25, 1906.
W. P. F. AYER.
PIPE COUPLING.
APPLICATION FILED JAN. 8, 1906.
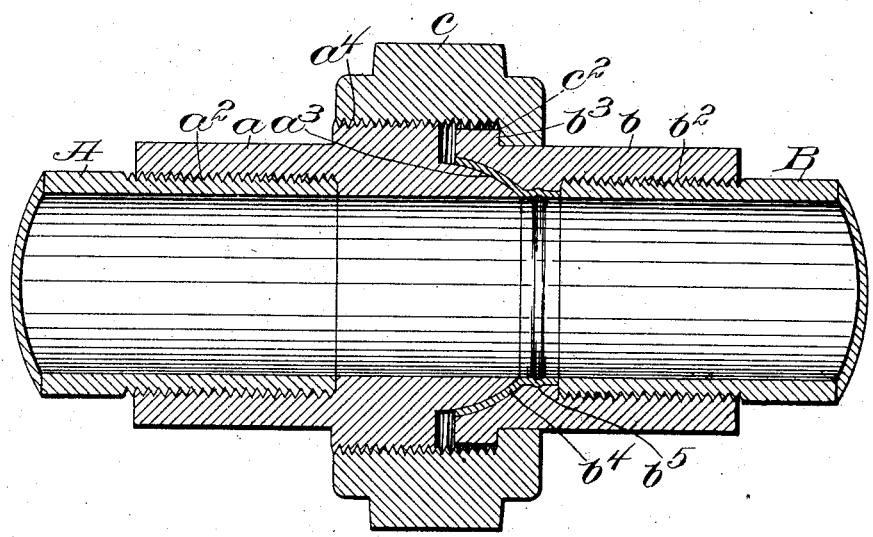

UNITED STATES PATENT OFFICE.

WILLIAM P. F. AYER, OF WINCHESTER, MASSACHUSETTS.

PIPE-COUPLING.

No. 839,090.  Specification of Letters Patent.  Patented Dec. 25, 1906.

Application filed January 8, 1906. Serial No. 294,981.

*To all whom it may concern:*

Be it known that I, WILLIAM P. F. AYER, a citizen of the United States, residing in Winchester, in the county of Middlesex and State of Massachusetts, have invented an Improvement in Pipe-Couplings, of which the following description, in connection with the accompanying drawings, is a specification, like letters on the drawings representing like parts.

The present invention relates to a pipe-coupling, and is embodied in a coupling of that type in which the two coupling members are provided with engaging faces adapted to be drawn into tight contact with each other by means of a coupling-nut, bolts, or other fastening devices. In couplings of this kind it is desirable to use iron, which is a relatively cheap material, for the coupling members; but in order to prevent corrosion at least one of the two adjoining faces is commonly composed of non-corrosive metal, such as brass, which is much more expensive than the cast-iron of which the coupling members are mainly formed.

The purpose of the present invention is to provide one of the coupling members with a non-corrosive engaging surface and at the same time to use the least possible amount of the more expensive metal.

In accordance with the invention the adjoining faces or engaging parts of the two coupling members are correspondingly tapered or rounded, so that a projecting part of one coupling member having an externally-rounded outer surface projects into the other coupling member, the inner surface of which is correspondingly rounded. One of these surfaces in accordance with the invention is covered with brass or other non-corrosive material, which is in the form of a tube expanded or spun into contact with the surface and which projects into the coupling member beyond the engaging surface thereof, the said coupling member being provided with a retaining portion, such as an annular groove or channel, into connection with which the non-corrosive metal is forced, so as to hold it firmly in position.

The drawing is a longitudinal section of a pipe-coupling embodying the invention.

As herein shown, the coupling member $a$ is provided with an internal screw-thread $a^2$ for attachment to a pipe A and constitutes the male member, being provided with a forwardly-projecting portion $a^3$, having a tapered or rounded outer surface which fits a correspondingly-shaped inner surface of the female member $b$. The said member $b$ is herein shown as provided with screw-threads $b^2$, which engage with the threads on a pipe B, and a flange $b^3$, which is engaged by the shoulder $c^2$ of the coupling-nut $c$, which engages with screw-threads $a^4$ on the outer surface of the member $a$.

As thus far described the coupling does not depart in any essential particular, except in the rounded shape of the engaging portions, from the couplings now commonly in use, and it is to be understood that any equivalent clamping or fastening device may be substituted for the clamping-nut $c$. In accordance with the invention, however, the engaging surface of one of the coupling members—in the construction shown the engaging surface of the member $b$—is coated with a thin layer $b^4$ of non-corrosive metal—such, for example, as brass—this surface being in the form of a tube which is expanded or spun into contact with the surface to which it is connected. In order to hold this supplemental surface portion firmly in place, the member to which it is connected is provided with an engaging portion, herein shown as the annular channel $b^5$ in the member $b$, the tubular surface portion being spun or expanded into the said channel, as indicated in the drawings. In the construction shown the portion $b^4$ is shown as bent outward, as by an expanding or spinning process, so as to extend into the channel, it being obvious, however, that with relatively soft metal the tubular portion might be acted upon by a suitable tool adapted to draw or thin out the softer metal, so that a portion thereof would be squeezed outwardly into the channel $b^5$.

It will be seen from the foregoing description that the non-corrosive surface of the coupling can be provided for with a very small amount of the more expensive material, a very thin tube of such material being all that is necessary to answer the purpose. Furthermore, the main parts of the coupling members need not be materially changed from the usual form, it being necessary only to supply the member which carries the non-corrosive surface with the shallow annular channel or equivalent retaining portion to coact with the surface part to hold the same in position. The rounding of the engaging surfaces, however, assists in keeping the coupling tight if the pipe should bend or sag at the joint.

What I claim is—

1. In a pipe-coupling, the combination with the member $a$, provided with the forwardly-projecting rounded surface $a^3$; of the member $b$ having an inner rounded surface to fit the surface $a^3$; the tubular non-corrosive surface portion $b^4$; and the annular channel $b^5$; the tubular, non-corrosive surface $b^4$ being spun into contact with said inner rounded surface and said annular channel $b^5$, substantially as described.

2. In a pipe-coupling, the combination of a member provided with a forwardly-projecting rounded surface, a second member having an inner rounded surface to fit the first-named surface and having also an annular channel, and a tubular non-corrosive member spun into contact with said inner rounded surface and annular channel.

In testimony whereof I have signed my name to this specification in the presence of two subscribing witnesses.

WILLIAM P. F. AYER.

Witnesses:
M. E. COVENEY,
H. J. LIVERMORE.